United States Patent
Seo et al.

(10) Patent No.: US 6,404,731 B2
(45) Date of Patent: Jun. 11, 2002

(54) CARTRIDGE FOR ACCOMMODATING A DISC

(75) Inventors: Young-sun Seo, Sungnam; Han-kook Choi; Jong-pil Park, both of Suwon; Young-min Cheong, Seoul; In-sik Park, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/244,758

(22) Filed: Feb. 5, 1999

(30) Foreign Application Priority Data

Feb. 10, 1998 (KR) ............................................. 98-3865
May 2, 1998 (KR) ............................................. 98-15882

(51) Int. Cl.⁷ .............................................. G11B 23/03
(52) U.S. Cl. .................................................... 369/291
(58) Field of Search ............................... 360/132, 133; 369/291; 206/308.1

(56) References Cited

U.S. PATENT DOCUMENTS

| | | | | |
|---|---|---|---|---|
| 4,724,962 A | | 2/1988 | Watanabe et al. .............. 206/44 |
| 5,009,382 A | * | 4/1991 | Huffaker et al. .......... 248/284.1 |
| 5,048,008 A | * | 9/1991 | Haruna ........................ 369/291 |
| 5,093,823 A | * | 3/1992 | Ouwerkerk et al. ........ 369/291 |
| 5,153,801 A | * | 10/1992 | Ikebe et al. .................. 360/133 |
| 5,247,416 A | * | 9/1993 | Shiba et al. .................. 360/133 |
| 5,260,931 A | * | 11/1993 | Sasaki et al. ................ 369/291 |
| 5,278,717 A | * | 1/1994 | Sasaki et al. ................ 360/133 |
| 5,570,342 A | * | 10/1996 | Kosaka ........................ 369/291 |

FOREIGN PATENT DOCUMENTS

| | | | |
|---|---|---|---|
| EP | 0 332214 A2 | | 9/1989 |
| EP | 0 936613 A3 | | 9/1999 |
| GB | 2081956 A | | 2/1982 |
| GB | 2 228 818 A | * | 9/1990 |
| JP | 58-17682 | | 2/1983 |
| JP | 60-234260 | * | 11/1985 |
| JP | 63-269387 | | 11/1988 |
| JP | 7-262732 | * | 10/1995 |
| JP | 8-180543 | * | 7/1996 |

* cited by examiner

Primary Examiner—William Klimowicz
(74) Attorney, Agent, or Firm—Staas & Halsey LLP

(57) ABSTRACT

A cartridge having a case which accommodates a disc, the case having a receiving opening and a longitudinal opening extending from the receiving opening through which an information reproducing apparatus chucks and accesses the disc, a shutter movably mounted on the case, the shutter opening/closing the longitudinal opening and a part of the receiving opening, and a covering part moved by the movement of the shutter so as to completely close the open part of the receiving opening which is not closed by the shutter. When the cartridge is not in use, the receiving opening and the longitudinal opening are not exposed, while the same are open when the cartridge is in use so that the information is recorded/reproduced on/from the disc accommodated therein. In addition, the cartridge can be compact-sized.

40 Claims, 14 Drawing Sheets

CARTRIDGE FOR ACCOMMODATING A DISC

CROSS-REFERENCE TO RELATED APPLICATIONS

This application is based upon and claims priority of Korean Patent Applications Nos. 98-3865 filed Feb. 10, 1998 and 98-15882 filed May 2, 1998, the contents being incorporated herein by reference.

BACKGROUND OF THE INVENTION

1. Field of the Invention

The present invention relates to a cartridge for accommodating and protecting a disc, such as a CD-ROM, DVD, or the like, so that information can be recorded/reproduced on/from the disc.

2. Description of the Related Art

A conventional cartridge for accommodating a disc accommodates and protects a disc from dust, fingerprints, scratching, etc., so that information is recorded/reproduced on/from the disc without an error. The cartridge is received by an information recording/reproducing device (hereinafter referred to as an information recording device) where the information is recorded/reproduced on/from the disc. The cartridge has a receiving opening for exposing the disc, and a longitudinal opening extending from the receiving opening. The receiving opening and the longitudinal opening are opened/closed by a shutter.

The information recording device has a means for opening/closing the shutter of the cartridge, a turn table on which the disc is placed through the receiving opening, a means for rotating the turn table, and an optical pick-up device for recording/reproducing the information on/from the disc.

The cartridge is seated on a tray of the information recording device, and accommodated/withdrawn into/from the information recording device. The shutter opening/closing means of the information recording device opens the shutter installed on the cartridge in one direction. While the receiving opening and the longitudinal opening of the cartridge are open, the disc is seated on the turn table having a diameter of approximately 28–30 mm, which is advanced into the receiving opening, and fastened by a chucking member disposed above. In this situation, the disc, the turn table, and the chucking member are rotated together by a spindle motor. While the disc is rotated, the optical pick-up device is linearly advanced in a radial direction of the disc, irradiating optical signals so as to record/reproduce the information on/from the disc.

However, since the conventional cartridge for accommodating the disc requires a shutter that is large enough to cover the receiving opening and the longitudinal opening, the cartridge has been inevitably voluminous. That is, since the receiving opening has a diameter of more than 28–30 mm to receive the turn table having a diameter of 28–30 mm, the receiving opening is larger than the longitudinal opening. Therefore, the shutter has to be larger than the receiving opening as well as the longitudinal opening in order to prevent the exposure of the receiving opening and the longitudinal opening when the cartridge is not in use. Accordingly, since the cartridge has to be large enough to accommodate the shutter moving laterally, the conventional cartridge is unnecessarily larger than the volume of the disc accommodated therein.

SUMMARY OF THE INVENTION

Accordingly, it is an object of the present invention to overcome above-described problems of the conventional cartridge, and to provide a cartridge for completely opening/closing a receiving opening and a longitudinal opening thereof with a shutter having less width, thereby minimizing the size of the cartridge.

Additional objects and advantages of the present invention will be set forth in part in the description which follows, and, in part, will be obvious from the description, or may be learned by practice of the invention.

Objects and advantages of the present invention are achieved with a cartridge for accommodating a disc, comprising: a case to accommodate the disc therein, the case having a receiving opening and a longitudinal opening through which an information reproducing device chucks and accesses the disc; a shutter, mounted on the case and movable with respect to the case, to open and close the longitudinal opening and a part of the receiving opening; and a closing device to completely close a part of the receiving opening which is not closed by the shutter, the closing device being operated by movement of the shutter.

Thus, in accordance with the present invention, when the cartridge is not in use, the receiving opening and the longitudinal opening are not exposed, while when the cartridge is in use, the receiving opening and the longitudinal opening are open so that information can be recorded/reproduced on/from the disc. Furthermore, unnecessary bulky volume of the cartridge is prevented, so that compact-sized products are produced.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
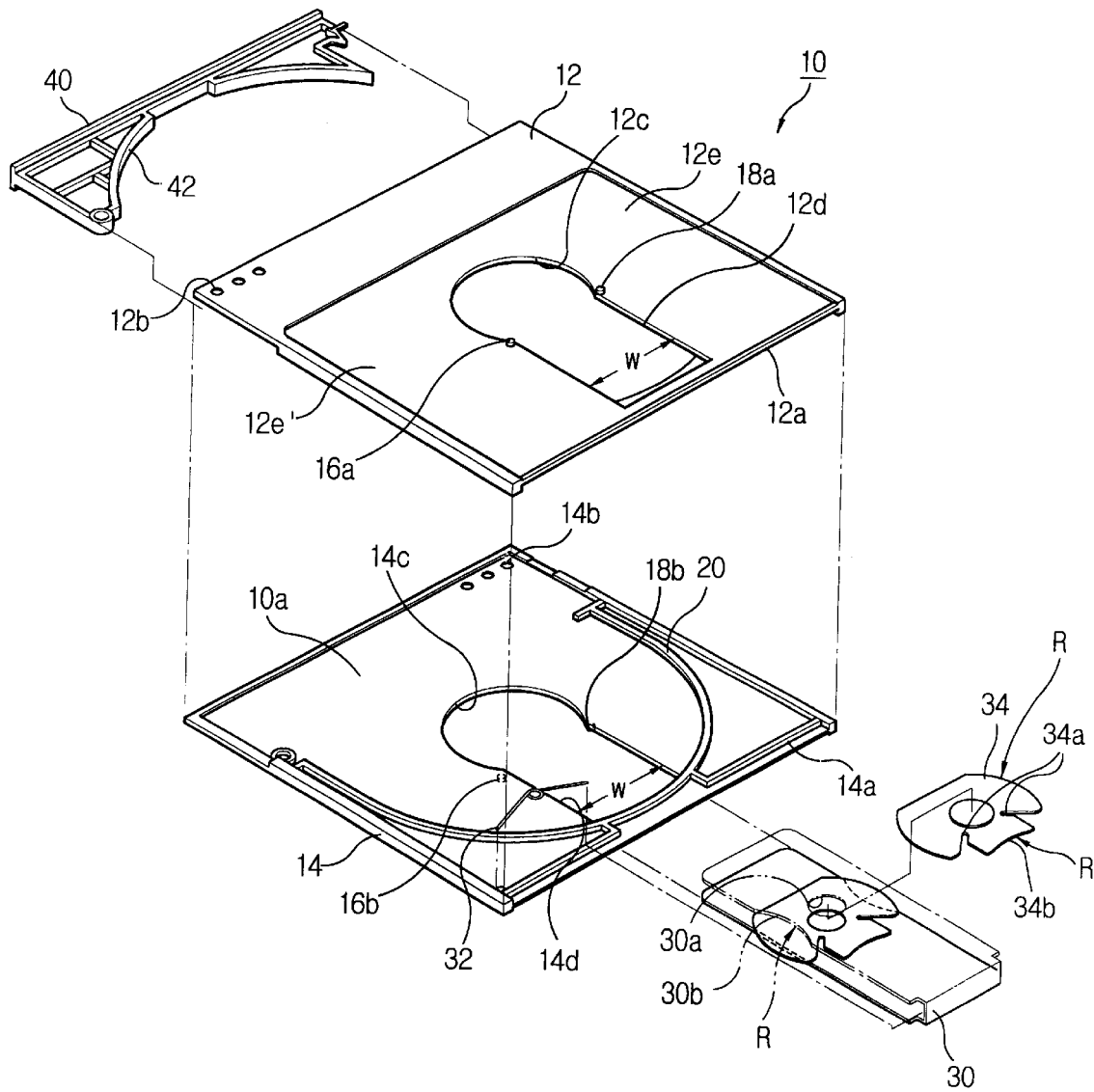
FIG. 1 is an exploded perspective view of a cartridge for accommodating a disc according to a first preferred embodiment of the present invention.

Reference will now be made in detail to the present preferred embodiments of the present invention, examples of which are illustrated in the accompanying drawings, wherein like reference numerals refer to like elements throughout.

The first preferred embodiment of the invention will now be described below with reference to FIGS. 1–6B, which are views illustrating a cartridge for accommodating a disc according to the first preferred embodiment of the present invention.

According to the first preferred embodiment of the present invention, the cartridge comprises a case 10 for accommodating a disc D', a shutter 30 mounted on a front surface of the case 10 so as to be capable of moving to the left and the right with respect to the front surface of the case 10, and a hinged cover 40 coupled by a hinge to a rear surface of the case 10 in order to prevent the disc D' from separating from the case 10.

The case 10 includes an upper plate 12, a lower plate 14 coupled with the upper plate 12, and a disc accommodation space 10a defined between the upper and the lower plates 12 and 14 in a symmetric manner so as to accommodate a double-sided disc as well as an one-sided disc.

A disc supporting means for supporting the disc D' is provided on the case 10 and the cover 40. The disc supporting means includes first arc ribs 20 for supporting the disc D' from a front section thereof, which are integrally formed on the respective inner surfaces of the upper and lower plates 12 and 14, and a second arc rib 42 integrally molded with the cover 40 to support the disc D' from a rear section thereof. The first and second arc ribs 20 and 42 have a diameter larger than that of the disc D' to allow the disc D' accommodated in the disc accommodation space 10a to be smoothly rotated therein.

Slide grooves 12a and 14a having a concave shape are formed at the front side of the case 10 defined by the upper plate 12 and the lower plate 14, and the shutter 30 is guided along the slide grooves 12a and 14a. A plurality of sensing holes 12b and 14b are formed near the rear side corners of the upper and lower plates 12 and 14, respectively. A plurality of sensing switches (not shown) are inserted into the sensing holes 12b and 14b and detect whether the disc D' is double-sided, formatted, etc.

Receiving openings 12c and 14c are respectively formed in the upper plate 12 and the lower plate 14. The receiving openings 12c and 14c preferably have a diameter of approximately 29.5–31.5 mm to allow a turn table (not shown) having a diameter of approximately 28–30 mm to be disposed therethrough, or to allow the disc D' to be directly seated onto the turn table, and to allow a chucking clamp 58 (FIG. 3) to be advanced thereto in order to chuck the disc D'. Longitudinal openings 12d and 14d each having a predetermined width W are extended from the receiving openings 12c and 14c, respectively, so that the longitudinal openings 12d and 14d serve as a route to an optical pick-up device (not shown).

A first hooking protrusion 16a and a second hooking protrusion 18a are formed on the upper plate 12 at the position where the receiving opening 12c and the longitudinal opening 12d meet each other, and a first hooking protrusion 16b and a second hooking protrusion 18b are formed on the lower plate 14 at the position where the receiving opening 14c and the longitudinal opening 14d meet each other. First and second escaping depressions 12e and 12e' are defined at an upper surface of the upper plate 12 and a lower surface of the lower plate 14. The shutter 30 is moved left or right toward the escaping depressions 12e and 12e'.

Figure 2:
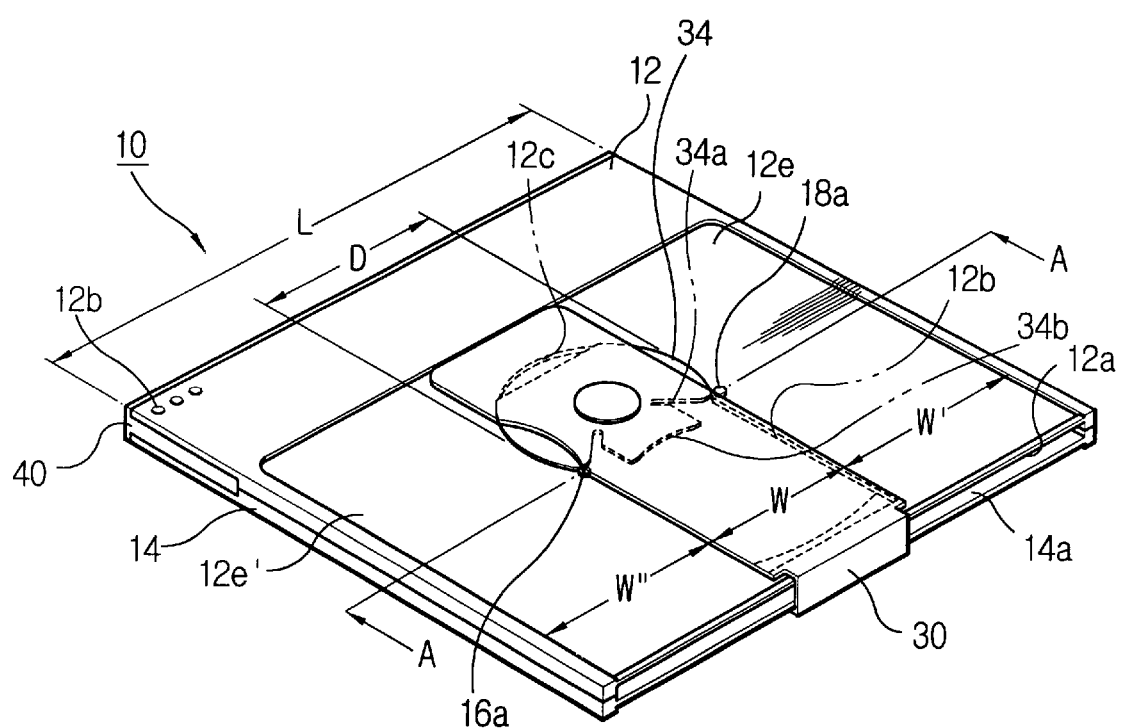
FIG. 2 is a perspective view of the cartridge for accommodating a disc according to the first preferred embodiment of the present invention.
Figure 3:
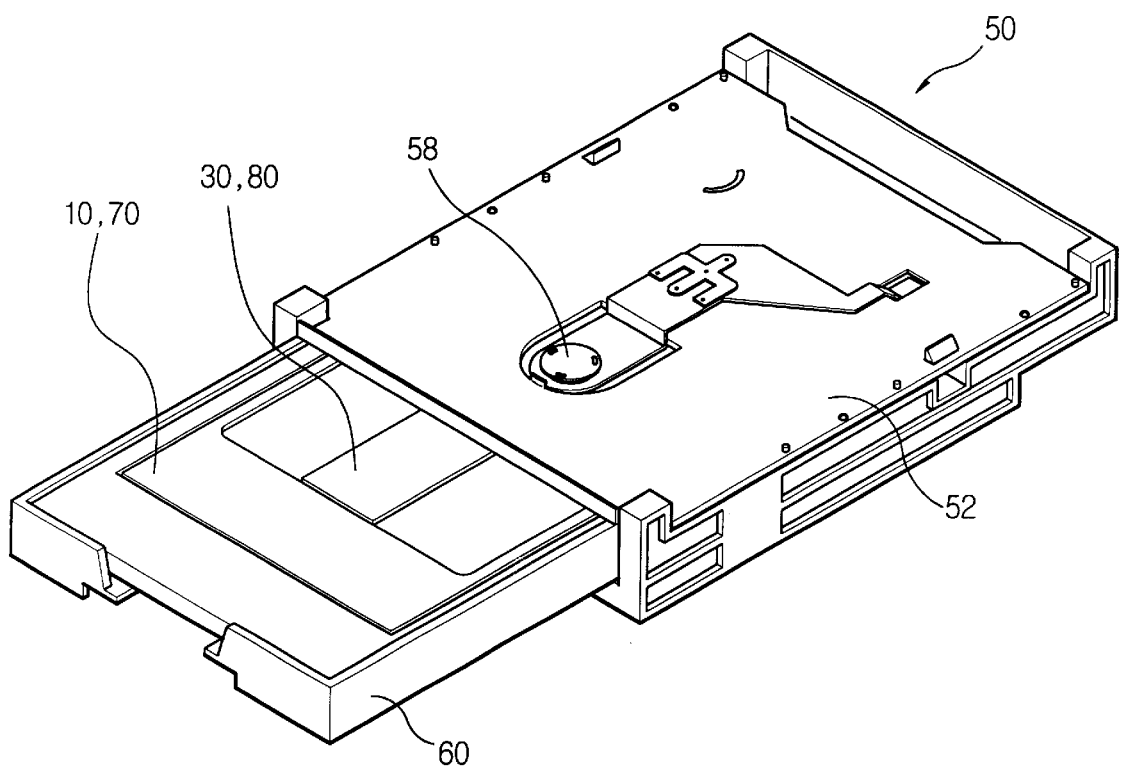
FIG. 3 is a perspective view of the cartridge for accommodating a disc and a drive for receiving and/or withdrawing the cartridge according to the first preferred embodiment of the present invention.
Figure 4A:
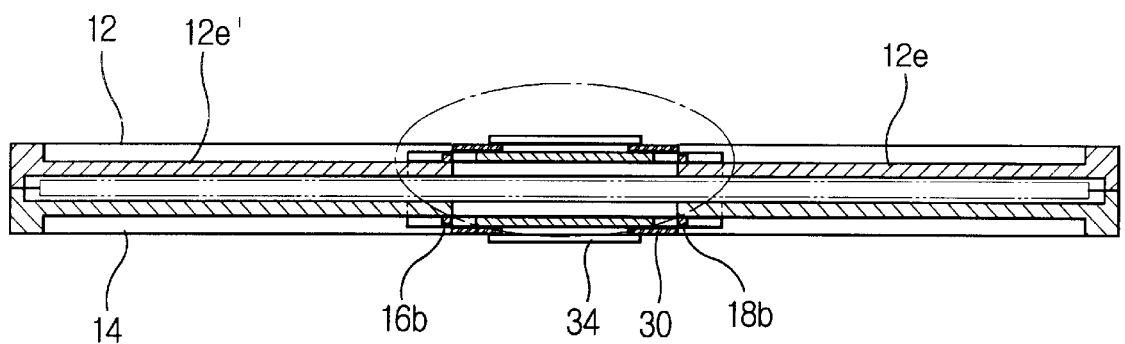
FIGS. 4A and 4B are sectional views taken along the line IV—IV shown in FIG. 2 according to the first preferred embodiment of the present invention.
Figure 4B:
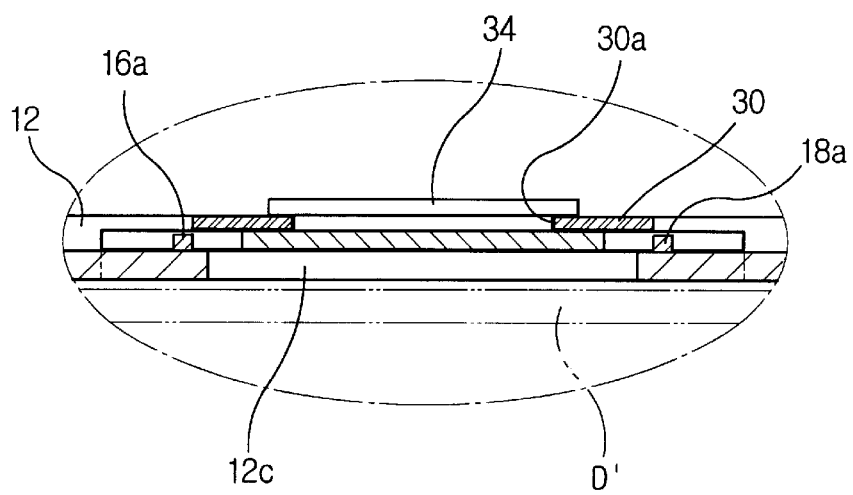

As shown in FIG. 2, to prevent sides of the shutter 30 from extending beyond the case 10, the first and second escaping depressions 12e and 12e' have widths W' and W", respectively, equal to or greater than the width W of the shutter 30. The lateral length L of the case 10 is less than or equal to a value three times the diameter D of the receiving openings 12c and 14c. The width W of the shutter 30 is less than the diameter D of the receiving openings 12c and 14c.

The shutter 30 has a shape similar to that of a folder, in order to cover the longitudinal openings 12d and 14d and a part of the receiving openings 12c and 14c. A shutter returning means is provided on the shutter 30 and the case 10 to return the shutter 30 to its initial position. The shutter returning means comprises a torsion spring 32 whose ends are respectively connected to the case 10 and the shutter 30. Inserting holes 30a are formed in the shutter 30. The inserting holes 30a are aligned with each other, and the respective centers of the inserting holes 30a are aligned with the center of the disc D' accommodated in the disc accommodation space 10a of the case 10.

The shutter 30 includes curved portions 30b. The curved portions 30b are aligned with a part of the receiving openings 12c and 14c which are not covered by the shutter 30. The curved portions 30b are respectively formed at each of upper and lower sides of the shutter 30. It is preferable that the curved portions 30b have the same radius of curvature as the radius R of curvature of the receiving openings 12c and 14c. As a result of the curved portions 30b, when the shutter 30 is moved either into the first escaping depression 12e or the second escaping depression 12e', the shutter 30 does not cover the receiving openings 12c and 14c.

A closing means is rotatably inserted from each inner face of the shutter 30 into the inserting holes 30a. The closing means comprises rotary plates 34 respectively having a pair of guide grooves 34a. When the shutter 30 is moved, the closing means is rotatably guided by one of the first hooking protrusions 16a and 16b which is inserted into one of the guide grooves 34a. When the shutter 30 covers the longitudinal openings 12d and 14d and a portion of the receiving openings 12c and 14c, the closing means closes the open portions of the receiving openings 12c and 14c which are not closed by the shutter 30 due to the curved portions 30b of the shutter 30.

The rotary plates 34 include curved sides 34b having a radius of curvature R as great as the radius of curvature of the receiving openings 12c and 14c. The curved sides 34b are curved in order not to be extended toward the receiving openings 12c and 14c when the rotary plates 34 are moved along with the shutter 30 toward the first or the second escaping depressions 12e or 12e'. When the shutter 30 covers the longitudinal openings 14c and 14d and a part of the receiving openings 12c and 14c, since both sides of the rotary plates 34 have a radius of curvature R which is the same as that of the receiving openings 12c and 14c, the sides of the rotary plates 34 completely close the open part of the receiving openings 12c and 14c.

A shutter opening/closing means comprises an upper cover 52, a link 54, an opening protrusion 56, and a torsion spring (not shown) to pull the shutter 30 in one direction so as to open the receiving openings 12c and 14c and the longitudinal openings 12d and 14d. The upper cover 52 is coupled to an upper portion of a drive 50 which loads/unloads the disc D', and the link 54 is slidably coupled to a lower surface of the upper cover 52. The opening protrusion 56 is projected from an end of the link 54 to open the shutter 30. The torsion spring (not shown) returns the shutter 30 to its initial position when a tray 60 is withdrawn from the drive 50.

The operation of the cartridge for accommodating the disc according to the first preferred embodiment of the present invention will be described in greater detail hereinafter with reference to FIGS. 5, 6A and 6B.

Figure 5:
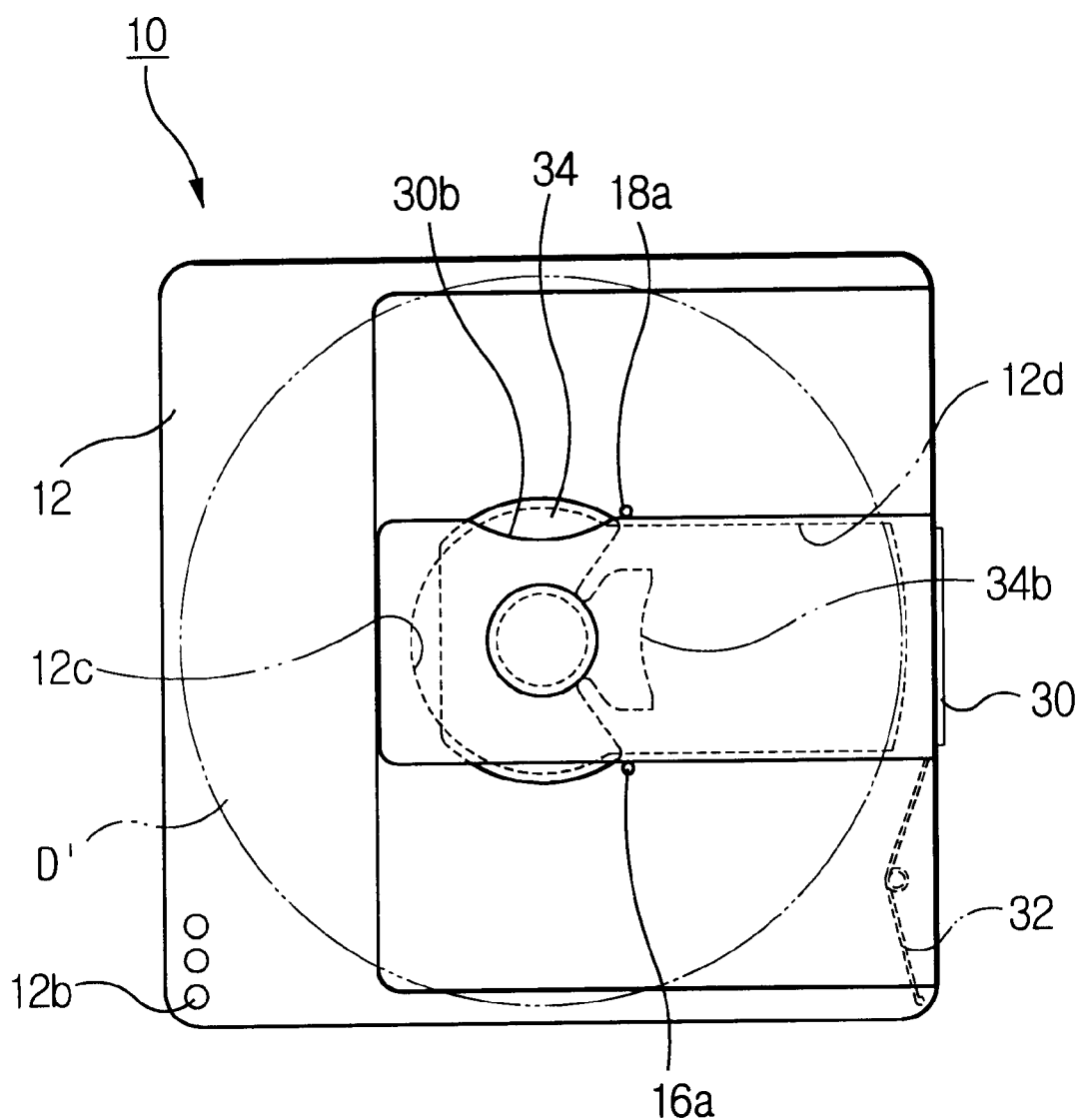
FIG. 5 is a top view of the cartridge for accommodating a disc according to the first preferred embodiment of the present invention.
Figure 6A:
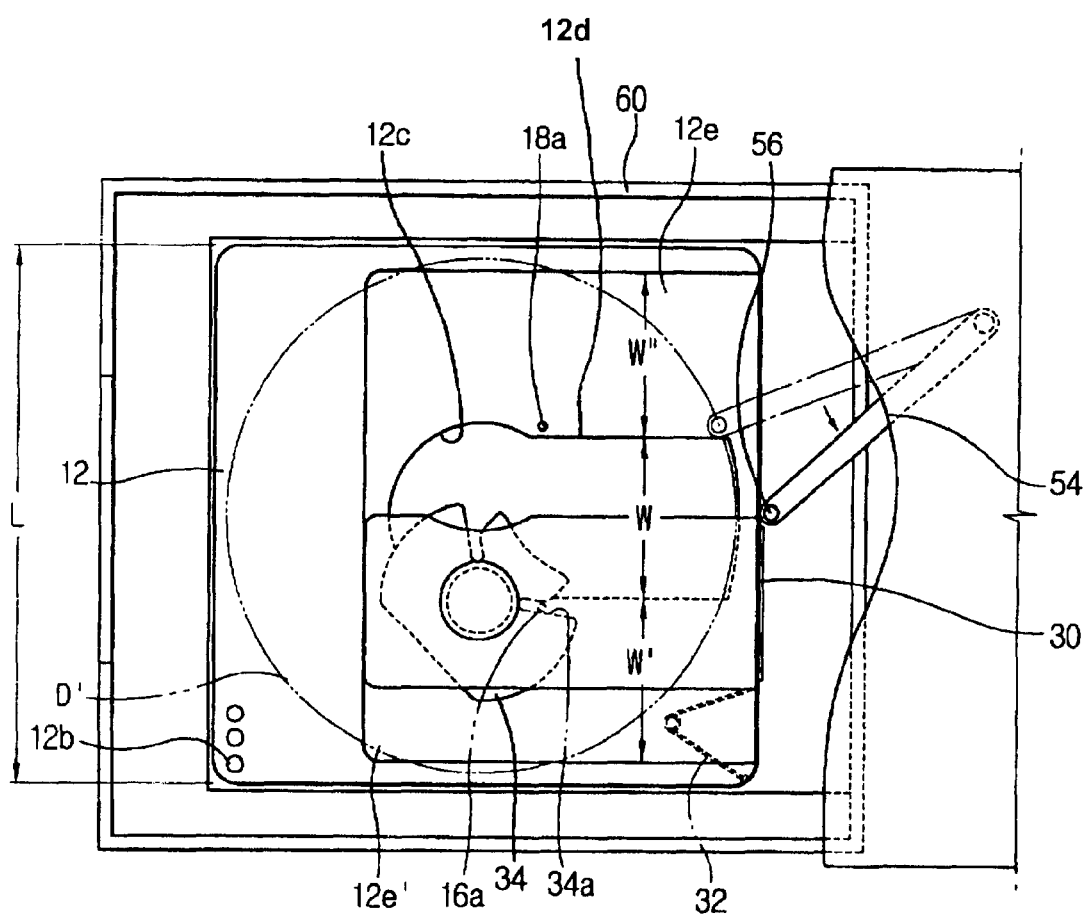
FIGS. 6A and 6B are top views of a shutter, which is opened by a shutter opening/closing device, when the cartridge is received by a drive according to the first preferred embodiment of the present invention.

First, as shown in FIG. 5, the one-sided or double-sided disc D' is accommodated in the case 10. In other words, the disc D', as shown in FIG. 1, is accommodated in the case 10 while the cover 40 hingedly coupled to the rear surface of the case 10 is open. As shown in FIG. 1, the disc D' accommodated in the disc accommodation space 10a is supported by the first and the second arc ribs 20 and 42 so that the disc D' is smoothly rotated therein. The first arc ribs 20 are formed at the upper and the lower plates 12 and 14 by an injection molding, while the second arc rib 42 is projected from the front surface of the cover 40.

In order to record/reproduce the information on/from the disc D' which is accommodated in the cartridge, the case 10 is disposed into an adaptor, such as an adaptor for accommodating a compact-sized cartridge as disclosed in Korean Patent Application No. 97-68987 or an adaptor for accommodating discs of different sizes as disclosed in Korean Patent Application No. 97-80284, or like other known adapters. The case 10 is seated onto the tray 60, and the case 10 and tray 60 are received/withdrawn into/from the information reproducing apparatus before the adaptor is received to the inner portion of the drive 50.

Then, the shutter 30, which closes the receiving openings 12c and 14c and the longitudinal openings 12d and 14d formed at the upper and the lower plates 12 and 14, contacts the opening protrusion 56 projected from the end of the link 54 so that the shutter 30 is moved toward the second escaping depression 12e' along the slide grooves 12a and 14a.

Upon movement of the shutter 30, the receiving openings 12c and 14c and the longitudinal openings 12d and 14d are opened, so that the turn table and the chucking clamp 58 are advanced through the receiving openings 12c and 14c. Consequently, the disc D' is seated and chucked, and the optical pick-up device is linearly moved in a radial direction of the disc D' to record/reproduce the information thereon/therefrom.

Figure 6B:
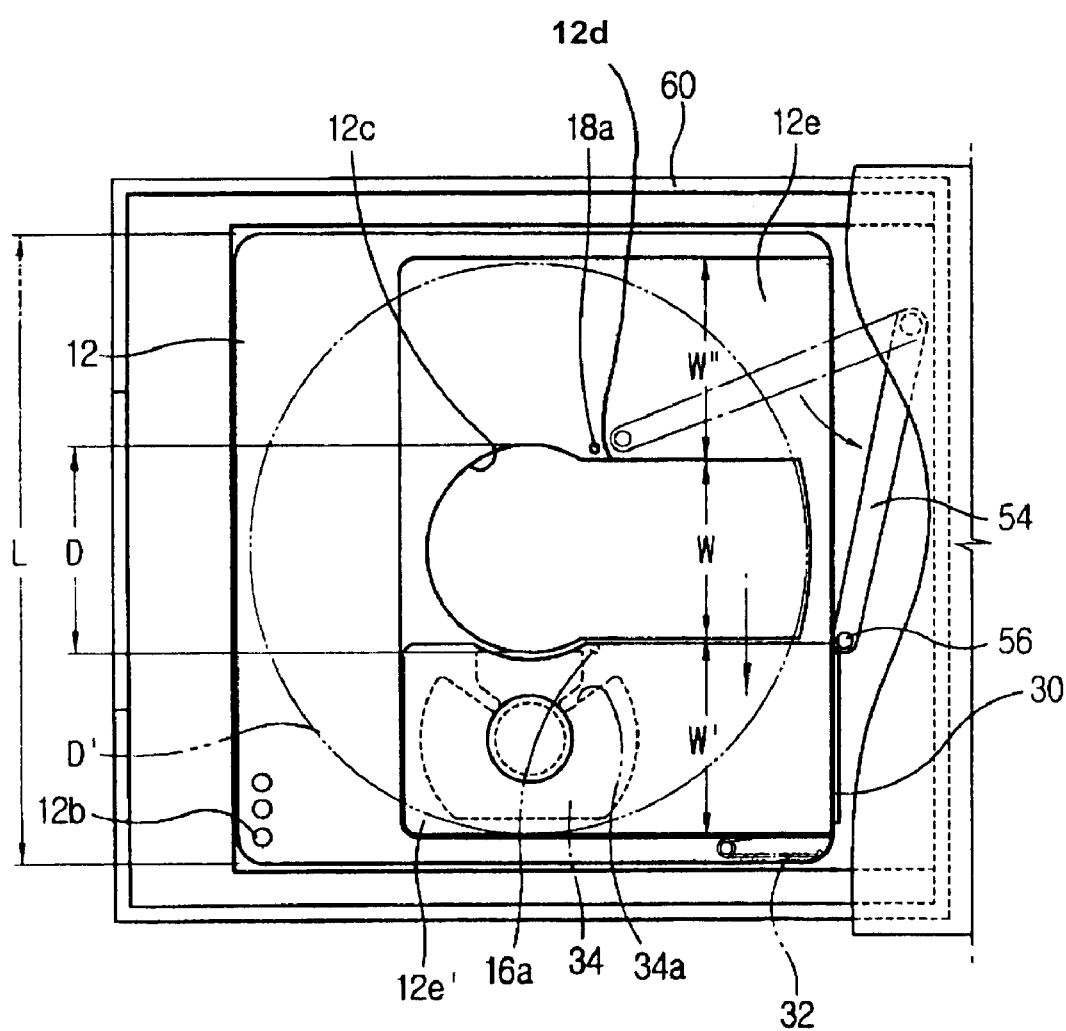

With the disc D' seated and chucked, as described above, the torsion spring 32, whose ends are respectively connected to the case 10 and the shutter 30, is in a distorted state, as shown in FIG. 6B. The rotary plates 34 are rotated by the shutter 30, which is advancing to the second escaping depression 12e'; from zero to ninety degrees (0–90°) so that the rotary plates 34 open the receiving openings 12c and 14c. More particularly, when the rotary plates 34 are moved to the second escaping depression 12e', respective surfaces thereof are placed in contact with the first hooking protrusions 16a and 16b, and simultaneously, the first hooking protrusions 16a, 16b are inserted into the guide grooves 34a of the rotary plates 34.

As the shutter 30 is completely moved to the second escaping depression 12e', one curved portion 30b of the shutter 30 and the curved sides 34b of the rotary plates 34 are aligned with each other, so that the receiving openings 12c and 14c and the longitudinal openings 12d and 14d are completely opened.

When the tray 60 is withdrawn from the drive 50 in order to replace the disc D' with a new one, or to record/reproduce the information on/from the other side of the disc D', the link 54 is returned to its initial position by the torsion spring 32. Also, the shutter 30 is returned to its initial position by the recovering force of the torsion spring 32. Then, the longitudinal openings 12d and 14d and the part of the receiving openings 12c and 14c are simultaneously closed.

When the shutter 30 is moved to the first escaping depression 12e, the rotary plates 34 inserted into the inserting holes 30a of the shutter 30 reverse the above-described operation thereof. That is, the rotary plates 34 are rotated toward right direction while the guide grooves 34a thereof are inserted, thereby guided by the second hooking protrusions 18a, 18b. Thus, the receiving openings 12c and 14c are completely opened.

FIGS. 7A to FIG. 11 are the views showing a cartridge for accommodating the disc D' according to the second preferred embodiment of the present invention.

According to the second preferred embodiment, the cartridge for accommodating a one-sided, or double-sided disc D' includes a case 120 having an upper plate 70 and a lower plate 110. The upper plate 70 and the lower plate 110 include receiving openings 70a and 110a and longitudinal openings 70b and 110b, respectively. A shutter 80 for opening/closing the longitudinal openings 70b and 110b and a part of the receiving openings 70a and 110a is mounted on the case 120. A cover 90 is hingedly coupled to a rear surface of the case 120 in order to prevent the disc D' from separating from the case 120.

A first escaping depression 70c and a second escaping depression 70c' are formed at opposite sides of the receiving openings 70a and 110a in the upper surface of the upper plate 70 and the lower surface of the lower plate 110 of the case 120. The shutter 80 is moved toward the first or the second escaping depression 70c or 70c'. A plurality of sensing holes 70d and 110d are formed near the rear corners of the case 120, and a plurality of sensing switches (not shown) for detecting the conditions of the disc D' accommodated in the case 120 are inserted into the sensing holes 70d, 110d.

The receiving openings 70a and 110a have a diameter of 29–31.5 mm in order to receive a turn table on which the disc D' is placed. The respective widths W2 and W3 of the first and the second escaping depressions 70c and 70c' are equal to or greater than the width W1 of the shutter 80 so that the sides of the shutter 80 do not extend out of the case 120. The lateral length L of the case 120 is less than or equal to a value three times the diameter D of the receiving openings 70a and 110a. The width W1 of the shutter 80 is less than the diameter D of the receiving openings 70a and 110a.

A shutter returning means is provided on a front side of the case 120. The shutter returning means returns the shutter 80 to its initial position. The shutter returning means comprises movable pieces 72 and torsion coil springs 74. The movable pieces 72 are reciprocally moved in a lateral direction along slide grooves 70e and 110e of the case 120. The ends of the torsion coil springs 74 are respectively connected to the case 120 and the movable pieces 72.

The shutter 80 can completely cover the longitudinal openings 70b, 110b while it can close a part of the receiving openings 70a and 110a. Contact pieces 82 project from inside both ends of the front of the shutter 80, and are in contact with the movable pieces 72 and move the movable pieces 72.

Curved members 84 are provided to a rear side of the shutter 80. The curved members 84 correspond to the receiving openings 70a and 110a and have projecting portions 84a respectively projecting from a top and a bottom surface thereof. Slant sides 84b are formed on the projecting portions 84a. Guide parts 86 are integrally formed on the shutter 80 at its rear end. The guide parts 86 are moved along guide rail 76 formed at the upper and the lower plates 70 and 110 of the case 120.

The curved members 84 have curved sides 84c at both sides thereof. The curved sides 84c have a radius of curvature which is the same as that of the receiving openings 70a and 110a so as to prevent the shutter 80 from being extended toward the receiving openings 70a and 110a when the shutter 80 is moved into the first escaping depression 70c or the second escaping depression 70c'. As a result of the presence of the curved sides 84c, the width W1 of the shutter 80 is minimized, so the lateral length L of the case 120, and widths W2 and W3 of the first and the second escaping depressions 70c and 70c' are minimized.

Figure 7A:
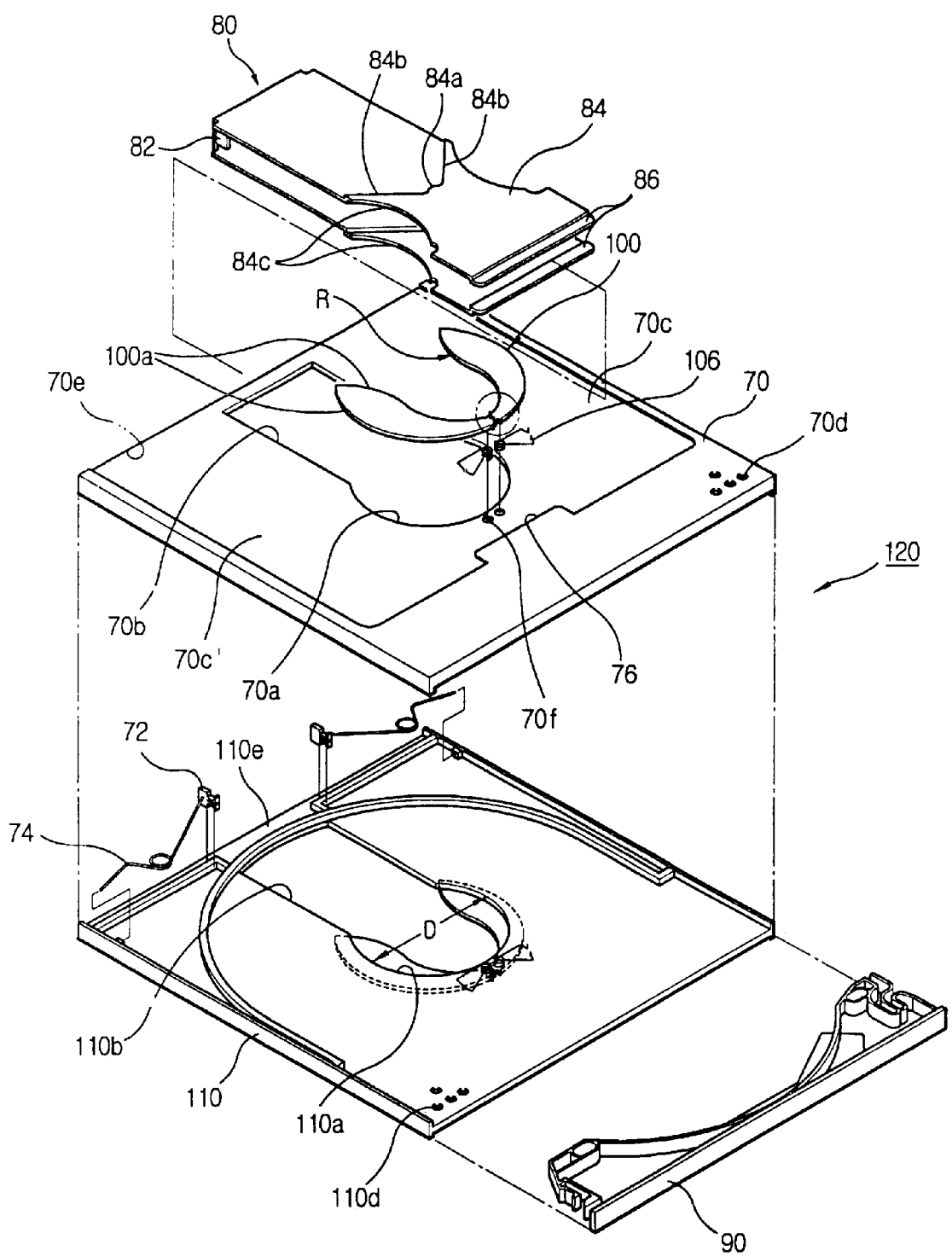
FIGS. 7A and 7B are exploded perspective views of a cartridge for accommodating a disc according to a second preferred embodiment of the present invention.
Figure 7B:
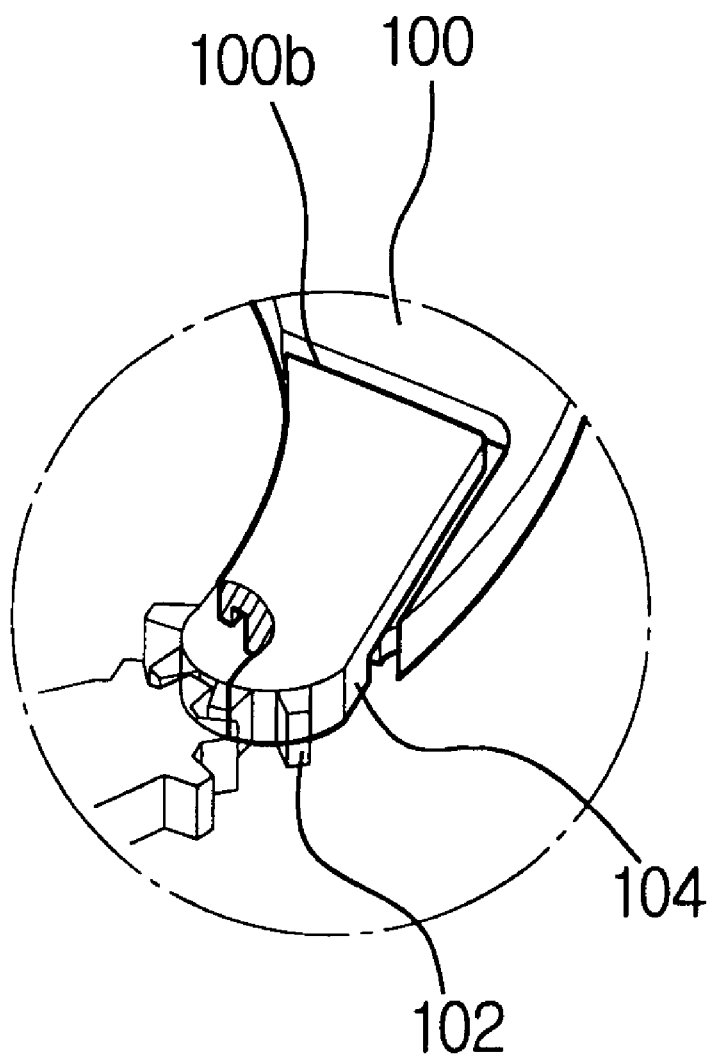
Figure 8:
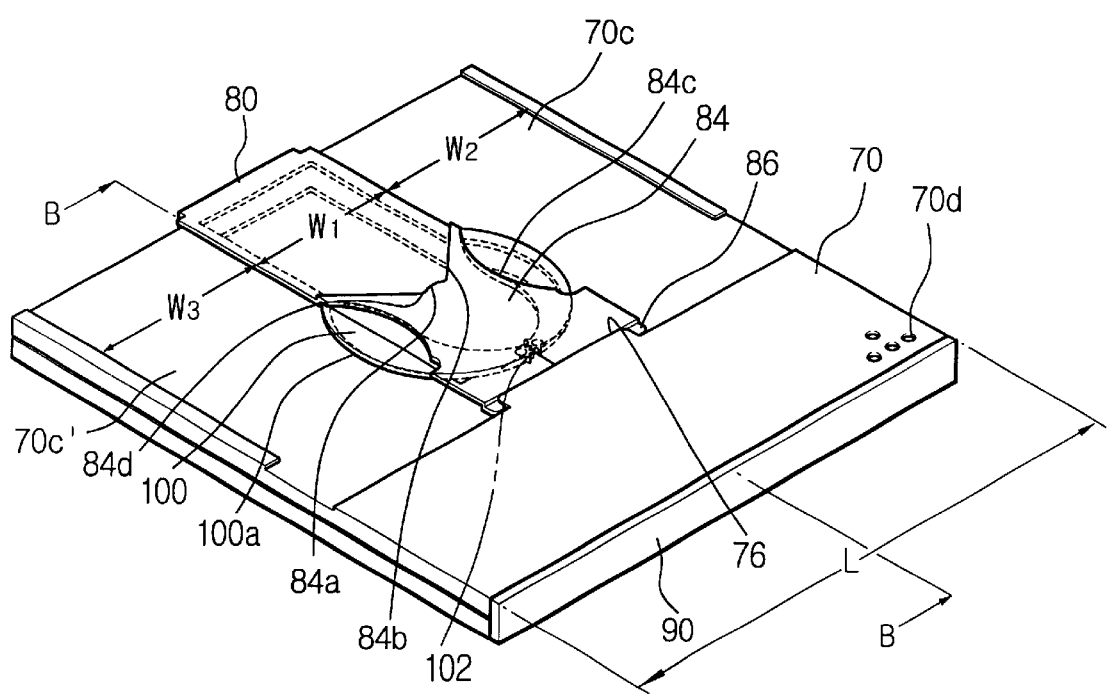
FIG. 8 is a perspective view of the cartridge for accommodating a disc according to the second preferred embodiment of the present invention.
Figure 9A:
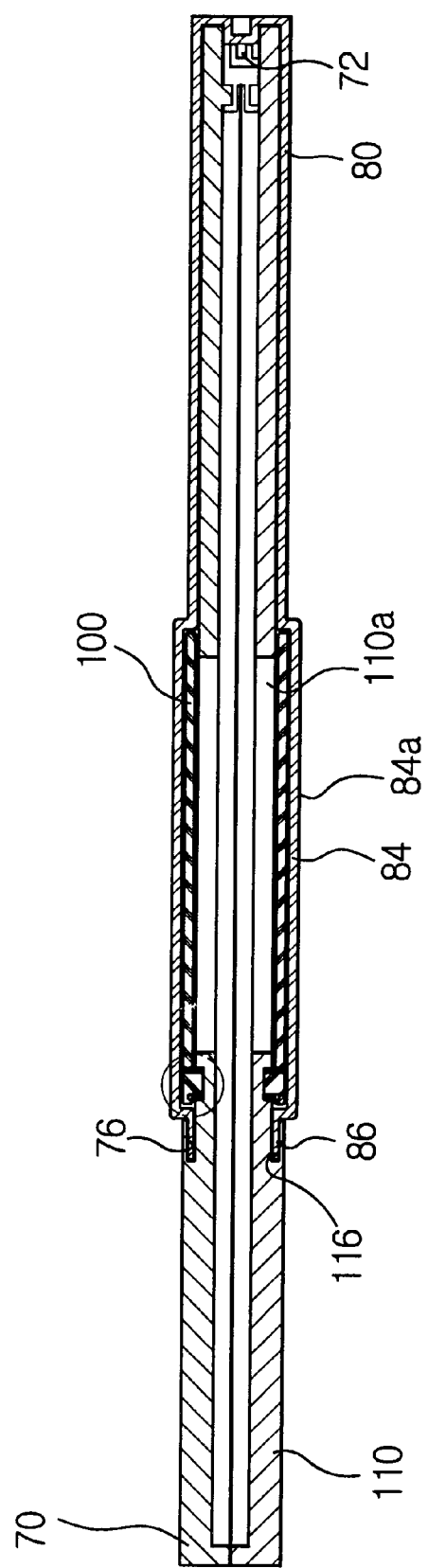
FIGS. 9A and 9B are sectional views taken along the line IX—IX shown in FIG. 8 according to the second preferred embodiment of the present invention.
Figure 9B:
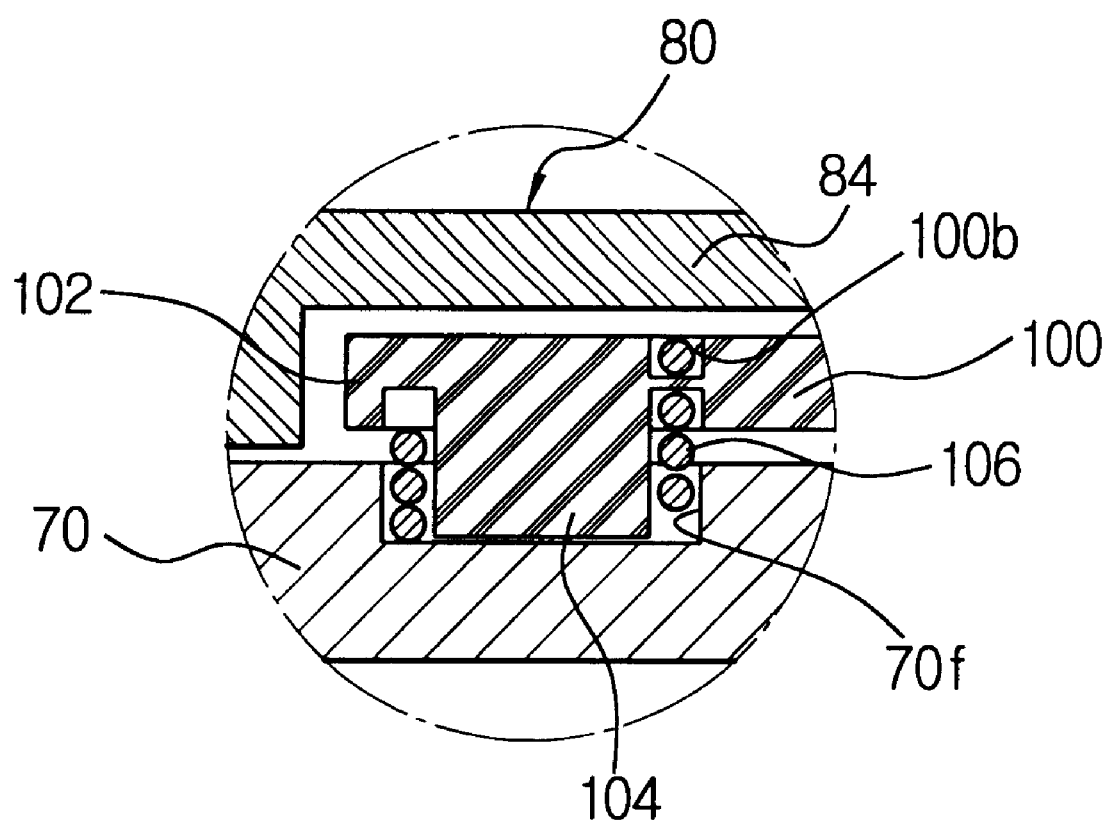

As shown in FIG. 7A, in order to completely close the receiving openings 70a and 110a, a part of which is open because of the curved sides 84c of the shutter, closing means for closing the receiving openings 70a and 110a are respectively provided on the upper surface of the upper plate 70 and the lower surface of the lower plate 110 of the case 120. The closing means comprises rotary plates 100 respectively inserted into a pair of inserting holes 70f formed in the case 120. The rotary plates 100 are rotated in a clockwise direction or a counterclockwise direction while the shutter 80 is moved. Arc sides 100a are formed at outer and inner portions of the rotary plates 100. The arc sides 100a have a radius of curvature which is the same as the radius of curvature of the receiving openings 70a and 110a, and which is the same as the radius of curvature of the curved sides 84c of the shutter 80.

Gear parts 102 engaged with each other are formed at ends of the rotary plates 100, and inserting protrusions 104 inserted into the inserting holes 70f are projected from a lower surface of the rotary plate 100. The torsion coil springs 106 are disposed at the inserting protrusions 104 in order to return the rotary plates 100 to their initial positions. Respective ends of the torsion coil springs 106 are connected to the case 120 and the rotary plate 100. Receiving recesses 100b having a predetermined depth are formed in the rotary plates 100. The receiving recesses 100b receive a part of the torsion coil springs 106.

Figure 10:
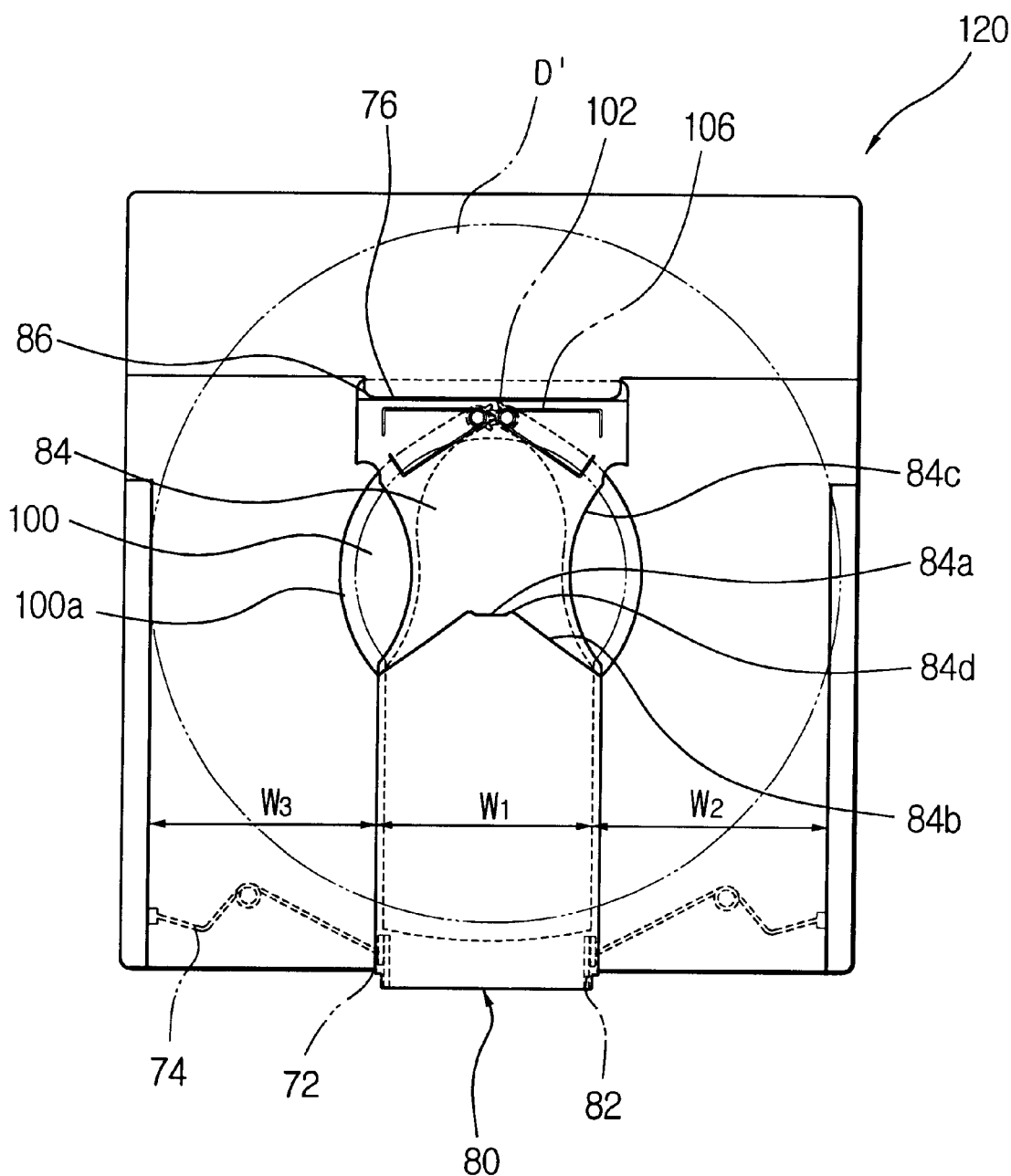
FIG. 10 is a top view of the cartridge for accommodating a disc according to the second preferred embodiment of the present invention.
Figure 11:
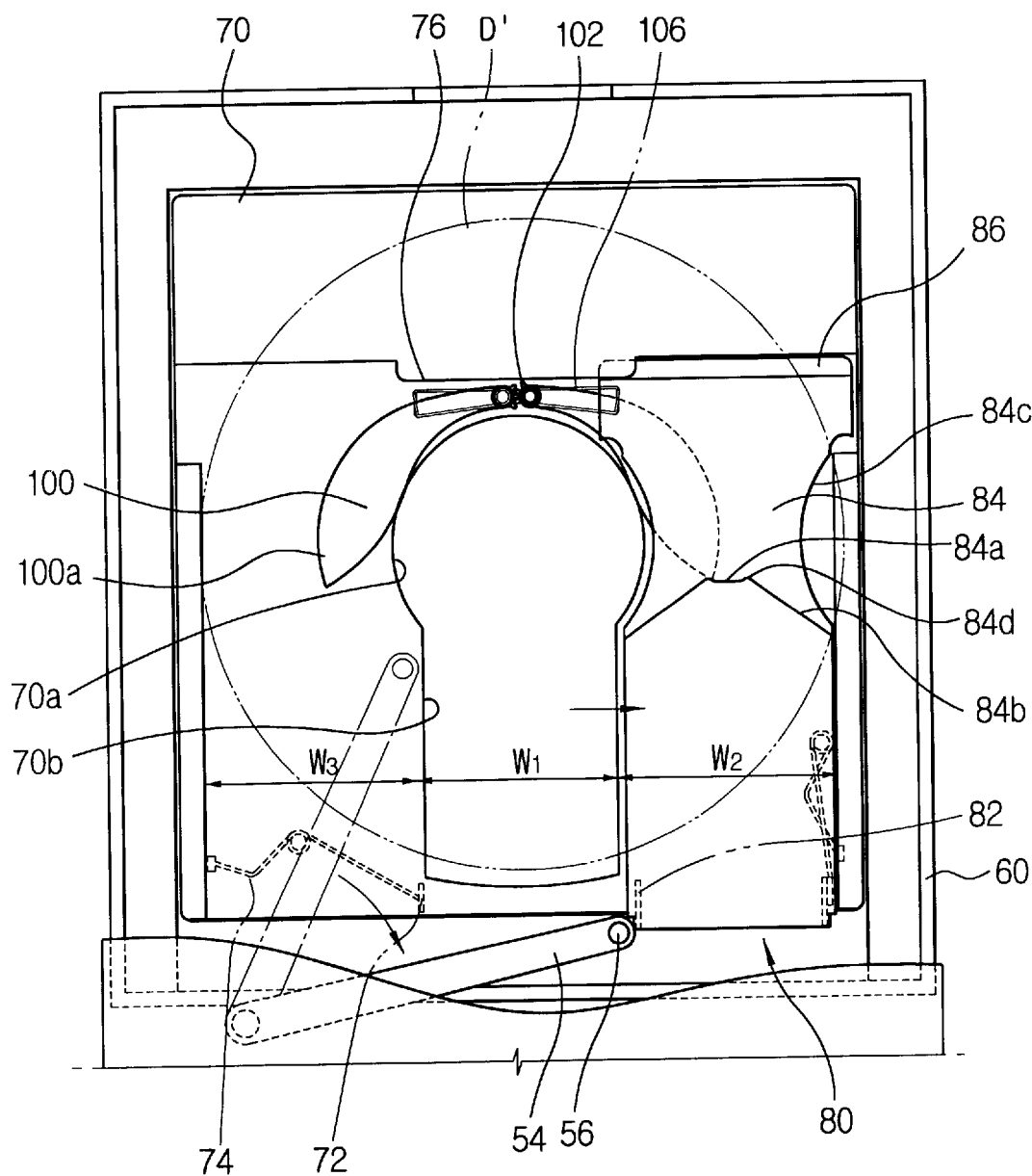
FIG. 11 is a view illustrating an operation of the cartridge for accommodating a disc in which the shutter mounted on the cartridge is opened by a shutter opening/closing device according to the second preferred embodiment of the present invention.

The other ends of the rotary plates 100 come in contact with the slant sides 84b formed at both sides of the curved members 84 when the shutter 80 is moved. Preferably, when the shutter 80 is moved, in order to prevent a release of the rotary plates 100 from the projecting portions 84a, hooking protrusions 84d are formed between the slant sides 84b of the curved members 84 (FIGS. 10 and 11). Alternatively, the projecting portions 84a can be lengthened.

The operation of the cartridge for accommodating the disc according to the second preferred embodiment of the present invention will now be described in greater detail hereinbelow with reference to FIG. 10 and FIG. 11.

First, the one-sided, or double-sided disc D' is accommodated in the case 120. Next, the case 120 is seated onto the adapter described hereinabove. The case 120 is then inserted into the inner portion of the drive 50 of the aforementioned information reproducing device (See FIG. 3). Then, as shown in FIG. 11, the shutter 80 disposed in the case 120 is moved to one of the first and the second escaping depressions 70c and 70c' along the sliding grooves 70e and 110e, while contacting the opening protrusion 56 projected from the end of the link 54.

In such a situation, the movable pieces 72 inserted into the sliding grooves 70e and 110e of the case 120 come in contact with the contacting pieces 82. Accordingly, the movable pieces 72 are pushed in a direction which is the same as that of the shutter 80 so that the movable pieces 72 compress the torsion coil springs 74. The rotary plates 100 inserted into the inserting holes 70f of the case 120 keep rotating until the shutter 80 is completely moved to its destination. While the rotary plates 100 are rotated, the rotary plates 100 slide over one hooking protrusion 84d of the projecting portions 84a and are hooked by the other hooking protrusion 84d, and thereby, the rotary plates 100 completely open the receiving openings 70a and 110a.

Since both arms of the rotary plates 100 have the gear parts 102 engaged with each other, the arms of the rotary plates 100 are always rotated toward opposite directions no matter which direction the shutter 80 is moved toward. Thus, the rotary plates 100 are capable of opening the receiving openings 70a and 110a completely. In this situation, the torsion coil springs 106 disposed at the outer side of the inserting protrusions 104 of the rotary plates 100 remain distorted.

More specifically, while the shutter 80 is moved into one of the escaping depressions 70c and 70c' of the shutter 80, the rotary plates 100 slide along the slanted sides 84b of the projecting portions 84a, so that the arc sides 100a of the rotary plates 100 are separated from each other. The arc sides 100a of the rotary plates 100 are then accommodated in the lower portion of the curved members 84 of the shutter 80.

Consequently, the receiving openings 70a and 110a and the longitudinal openings 70b and 110b are completely opened by the shutter 80, so that the turn table for positioning the disc D' and the chucking clamp 58 for chucking the disc D' are advanced into the receiving openings 70a and 110a. Also, the optical pick-up device is linearly moved along the longitudinal openings 70b and 110b in a radial direction of the disc D' while recording/reproducing the information on/from the disc D'.

In order to replace the disc D', or to record/reproduce the information on/from the other side of the disc D', the tray 60 is withdrawn from the drive 50, and the shutter 80 is returned to its initial position by the torsion coil springs 74, as described hereinabove. Accordingly, the longitudinal openings 70b and 110b and a part of the receiving openings 70a and 110a are simultaneously closed. Also, the rotary plates 100 are rotated in a reverse direction toward the curved sides 84c of the curved members 84 of the shutter 80. As a result, the part of the receiving openings 70a and 110a, which were open because of the curved portions 84c of the shutter 80, are completely closed.

As described above, in accordance with embodiments of the present invention, the receiving openings and the longitudinal openings extended from the receiving openings are not exposed outward when the cartridge is not in use. Then, when the cartridge is in use, the receiving openings and the longitudinal openings are simultaneously opened so that the information is recorded/reproduced on/from the disc accommodated therein. In addition, the cartridge can be compact-sized.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening; and
   a closing device to completely close a part of the receiving opening not closed by the shutter, the closing device being rotatably operated by a movement of the shutter, wherein the case comprises a first escaping depression into which the shutter is moved when the shutter moves in a first direction and a second escaping depression into which the shutter is moved when the shutter moves in a second direction opposite the first direction.

2. The cartridge as claimed in claim 1, wherein the first escaping depression and the second escaping depression respectively have a width equal to or greater than a width of the shutter, wherein a side of the shutter does not cover the receiving opening while the receiving opening is opened by the shutter.

3. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening; and
   a closing device to completely close a part of the receiving opening not closed by the shutter, the closing device being rotatably operated by a movement of the shutter, wherein the shutter comprises:
      a curved member at a position corresponding to the receiving opening, the curved member protruding from an upper surface of the shutter and including a projecting portion having slanted sides; and
      a guide part extending from a rear end of the curved member.

4. The cartridge as claimed in claim 3, wherein the projecting portion comprises hooking protrusions formed at inner ends of the respective slanted sides.

5. The cartridge as claimed in claim 3, wherein the curved member comprises curved sides having a radius of curvature which is the same as a radius of the curvature of the receiving opening.

6. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening; and
   a closing device to completely close a part of the receiving opening not closed by the shutter, the closing device being rotatably operated by a movement of the shutter, wherein the closing device comprises a rotary plate rotated by linear movement of the shutter.

7. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening; and
   a closing device to completely close a part of the receiving opening not closed by the shutter, the closing device being rotatably operated by a movement of the shutter, wherein the closing device comprises plates fixed by a hinge to a pair of inserting holes formed in the case, the plates being rotated symmetrically in opposite directions while the receiving opening is opened and closed.

8. The cartridge as claimed in claim 7, wherein an outer side and an inner side of the respective plates are respectively arc shaped and have a radius of curvature which is the same as the radius of curvature of the receiving opening and a curved side of the shutter.

9. The cartridge as claimed in claim 7, wherein the respective plates comprise:
   a gear part formed at an end thereof;
   protrusions formed near the gear part, the protrusions being inserted into the inserting holes; and
   a receiving recess to receive one end of a torsion coil spring whose other end is supported by the case to return the plate to an initial position.

10. A device for accommodating a disc, comprising:
    a case to accommodate the disc, the case having an opening through which the disc is accessed;
    a shutter to open the opening and to partially close the opening; and
    a closing device to rotatably close the part of the opening not closed by the shutter according to a linear motion of the shutter,
    wherein the opening is through which information is recorded to or reproduced from the disc.

11. The device as claimed in claim 10, wherein the case includes a depression into which the shutter is moved to open the opening, wherein a width of the depression is equal to or greater than a width of the shutter.

12. A device for accommodating a disc, comprising:
    a case to accommodate the disc, the case having an opening through which the disc is accessed;
    a shutter to open the opening and to partially close the opening; and
    a closing device to rotatably close the part of the opening not closed by the shutter,
    wherein the closing device comprises:
       a rotary plate fixed to the shutter, the rotary plate covering the part of the opening not closed by the shutter.

13. The device as claimed in claim 12, wherein the opening comprises a portion having a diameter which is greater than a width of the shutter, and the rotary plate has a radius of curvature equal to a radius of curvature of the opening.

14. The device as claimed in claim 13, wherein the rotary plate is rotated by a linear movement of the shutter.

15. The device as claimed in claim 12, wherein the rotary plate includes an outer side and an inner side which are respectively arc shaped and have a radius of curvature which is the same as a radius of curvature of the opening.

16. The device as claimed in claim 12, wherein the opening comprises a longitudinal opening and a circular opening, the shutter completely closes the longitudinal opening and partially closes the circular opening, and the rotary plate closes the portion of the circular opening not closed by the shutter.

17. The device as claimed in claim 16, wherein the shutter includes a curved portion at a location corresponding to the circular opening, the shutter does not close the circular opening at the location of the curved portion, and the rotary plate closes the circular opening at the location of the curved portion.

18. The device as claimed in claim 17, wherein the curved portion has a radius of curvature which is the same as a radius of curvature of the circular opening such that the curved portion is not extended toward the circular opening when the shutter opens the opening.

19. A device for accommodating a disc, comprising:
   means for holding the disc, the means for holding having an opening through which the disc is accessed;
   means for partially closing the opening; and
   means for rotatably closing a part of the opening not closed by the means for partially closing,
   wherein
      the opening is through which information is recorded to or reproduced from the disc, and
      the means for rotatably closing the part moves in accordance with a linear motion of the means for partially closing the opening.

20. A cartridge for accommodating a double-sided disc, comprising:
   a symmetrical case to accommodate the double-sided disc, the case including a receiving opening and a longitudinal opening through which an information reproducing device chucks and accesses the double-sided disc;
   a shutter, mounted on the case and movable with respect to the case, to open and close the longitudinal opening and to partially open and close the receiving opening; and
   a closing device to completely close a part of the receiving opening not closed by the shutter, the closing device being operated by a linear movement of the shutter.

21. A cartridge for accommodating a disc, comprising:
   a case to accommodate the disc, the case including a receiving opening and a longitudinal opening through which an information reproducing device chucks and accesses the disc, and first and second escaping depressions;
   a shutter, mounted on the case and movable with respect to the case, to open and close the longitudinal opening and to partially open and close the receiving opening; and
   a closing device to completely close a part of the receiving opening not closed by the shutter, the closing device being operated by a movement of the shutter;
      wherein the shutter is moved into the first escaping depression when the shutter moves in a first direction, and the shutter is moved into the second escaping depression when the shutter moves in a second direction opposite the first direction.

22. The cartridge as claimed in claim 21, wherein the first escaping depression and the second escaping depression respectively have a width equal to or greater than a width of the shutter, wherein a side of the shutter does not cover the receiving opening while the receiving opening is opened by the shutter.

23. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening; and
   a closing device to completely close a part of the receiving opening not closed by the shutter, the closing device being operated by a linear movement of the shutter, and having a curved side having a radius of curvature which is the same as a radius of curvature of the receiving opening, the curved side not extending toward the receiving opening when the shutter opens the receiving opening.

24. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening, having
      a curved member at a position corresponding to the receiving opening, the curved member protruding from an upper surface of the shutter and including a projecting portion having slanted sides, and
      a guide part extending from a rear end of the curved member; and
   a closing device to completely close a part of the receiving opening not closed by the shutter, the closing device being operated by a movement of the shutter.

25. The cartridge as claimed in claim 24, wherein the projecting portion comprises hooking protrusions formed at respective inner ends of the slanted sides.

26. The cartridge as claimed in claim 24, wherein the curved member comprises curved sides having a radius of curvature which is the same as a radius of the curvature of the receiving opening.

27. A cartridge for accommodating a disc, comprising:
   a case to accommodate the disc, the case including a receiving opening and a longitudinal opening through which an information reproducing device chucks and accesses the disc;
   a shutter, mounted on the case and movable with respect to the case, to open and close the longitudinal opening and to partially open and close the receiving opening; and
   a closing device to completely close a part of the receiving opening not closed by the shutter, the closing device being rotatably operated by a movement of the shutter, wherein the closing device is rotatably fixed on the shutter.

28. The cartridge as claimed in claim 27, wherein a lateral length of the case is less than or equal to three times a diameter of the receiving opening.

29. The cartridge as claimed in claim 27, wherein the case is symmetrical and accommodates a double-sided disc.

30. The cartridge as claimed in claim 27, wherein the case includes a cover hinged to a side of the case to prevent the disc accommodated in the case from separating from the case.

31. The cartridge as claimed in claim 27, wherein the case further comprises a returning device to return the shutter to an initial position.

32. The cartridge as claimed in claim 31, wherein the returning device comprises a torsion spring having ends respectively connected to the case and to the shutter.

33. The cartridge as claimed in claim 31, wherein the returning device comprises:

a movable piece which is moved along a slide groove of the case in a lateral direction; and a torsion coil spring having ends respectively connected to the case and to the movable piece.

34. The cartridge as claimed in claim 33, wherein the longitudinal opening of the case has a width less than a diameter of the receiving opening.

35. The cartridge as claimed in claim 27, wherein the longitudinal opening of the case has a width less than a diameter of the receiving opening.

36. The cartridge as claimed in claim 27, wherein the case includes a first hooking protrusion and a second hooking protrusion formed at a position where the receiving opening and the longitudinal opening meet each other, to rotate the closing device.

37. The cartridge as claimed in claim 27, wherein the receiving opening has a diameter of approximately of 29.5–31.5 mm.

38. The cartridge as claimed in claim 27, wherein the closing device comprises a curved side having a radius of curvature which is the same as a radius of curvature of the receiving opening, the curved side not extending toward the receiving opening when the shutter opens the receiving opening.

39. A device for accommodating a disc, comprising:

a case to accommodate the disc, the case having an opening through which the disc is accessed;

a shutter to open the opening and to partially close the opening; and a closing device to rotatably close the part of the opening not closed by the shutter, wherein the opening is through which information is recorded to or reproduced from the disc, and the closing device is rotatably fixed on the shutter.

40. A device for accommodating a disc, comprising:

means for holding the disc, the means for holding having an opening through which the disc is accessed;

means for partially closing the opening; and means for rotatably closing a part of the opening not closed by the means for partially closing, wherein the opening is through which information is recorded to or reproduced from the disc, and the means for rotatably closing is rotatably fixed on the means for partially closing.

\* \* \* \* \*